United States Patent
Clapp

(10) Patent No.: US 6,661,567 B2
(45) Date of Patent: Dec. 9, 2003

(54) OPTICAL AMPLIFIER, OPTICAL AMPLIFIER HYBRID ASSEMBLY AND METHOD OF MANUFACTURE

(75) Inventor: Terry V Clapp, Herts (GB)

(73) Assignee: Bookham Technology PLC, Oxfordshire (GB)

(*) Notice: Subject to any disclaimer, the term of this patent is extended or adjusted under 35 U.S.C. 154(b) by 0 days.

(21) Appl. No.: 09/731,434

(22) Filed: Dec. 6, 2000

(65) Prior Publication Data
US 2002/0171918 A1 Nov. 21, 2002

(51) Int. Cl.$^7$ .................................................. H01S 3/00
(52) U.S. Cl. ........................ 359/333; 359/337; 359/342; 385/49; 385/131; 385/132
(58) Field of Search ................................ 359/333, 337, 359/342; 385/123, 39, 49, 131, 132

(56) References Cited

U.S. PATENT DOCUMENTS

| | | | |
|---|---|---|---|
| 4,941,738 A | | 7/1990 | Olsson ........................ 359/333 |
| 5,365,538 A | * | 11/1994 | Tumminelli et al. ........... 372/66 |
| 5,463,649 A | * | 10/1995 | Ashby et al. .................. 372/40 |
| 5,475,775 A | * | 12/1995 | Kragl et al. ................. 264/1.24 |
| 5,534,442 A | | 7/1996 | Parker et al. .................. 372/50 |
| 5,574,811 A | * | 11/1996 | Bricheno et al. ............. 385/130 |
| 5,633,968 A | * | 5/1997 | Sheem .......................... 385/53 |
| 5,668,823 A | | 9/1997 | Harrison et al. ................ 437/2 |
| 5,703,980 A | * | 12/1997 | MacElwee et al. ............ 385/30 |
| 5,853,626 A | * | 12/1998 | Kato ........................... 216/24 |
| 5,985,086 A | * | 11/1999 | Peall .......................... 156/292 |
| H1848 H | * | 5/2000 | Amin et al. .................. 385/132 |
| 6,083,843 A | * | 7/2000 | Ohja et al. .................... 438/710 |
| 6,094,297 A | * | 7/2000 | Injeyan et al. ............... 359/345 |
| 6,178,040 B1 | * | 1/2001 | Injeyan et al. ............... 354/346 |
| 6,204,958 B1 | * | 3/2001 | Taylor et al. ................. 359/130 |
| 6,236,793 B1 | * | 5/2001 | Lawrence et al. ............. 372/6 |
| 6,357,913 B1 | | 3/2002 | Kim et al. .................... 359/115 |
| 6,385,369 B1 | | 5/2002 | Hill et al. .................... 359/483 |

FOREIGN PATENT DOCUMENTS

GB 2213957 B 8/1989

OTHER PUBLICATIONS

Hattori, K. "Er–doped Planar Waveguide Devices." LEOS 1997, Nov., 1997, pp. 308–309.*

Krishnaswamy, M. et al. "Optical Properties o fPolymer Waveguide Dispensed on an Erbium/Ytterbium Codoped Glass." IEEE J. Selected Topics in Quantum Elect. 2:2, Jun. 1996. pp. 373–377.*

Vermelho, M.V.D. et al. "Simple and accurate procedure for modelling erbium–doped waveguide amplifers and lasers with hihg erbium concentration." IEE Colliquium on New Developments in Optical Amplifiers, Nov. 1998, pp. 13/1–13/6.*

(List continued on next page.)

*Primary Examiner*—Thomas G. Black
*Assistant Examiner*—Stephen Cunningham
(74) *Attorney, Agent, or Firm*—Renner, Otto, Boisselle & Sklar

(57) ABSTRACT

An optical amplifier is provided from a body 21, at least part 25 of which is doped with a rare earth such as erbium. At least one waveguide 47 extends through the doped part of the body. Pump light 51 is input on a side face 35 of the body and is distributed in the body over the length of the waveguide 47. A reflective coating 57 may be provided away from the pump light input, including on the opposite face 37 to the pump light input, to multiply reflect pump light within the body 21 to distribute the pump light within the body. The body may be in the form of a slab.

30 Claims, 3 Drawing Sheets

OTHER PUBLICATIONS

Shmulovich, J. et al. "Integrated Planar waveguide amplifier with 15 dB net gain at 1550 nm." OFC/IOOC '99 Technical Diges Feb. 1999, pp. PD42/1–PD42-3.*

Huang, W. and Syms, R.A. "Analysis of Folded Erbium–Doped Planar Waveguide Amplifiers by the Method of Lines." J. Lightwave Tech. 17:12, Dec. 1999. pp. 2658–2664.*

Di Pasquale, F. et al., "Finite–Element Modeling of Silica Waveguide Amplifiers with High Erbium Concentration." J. Lightwave Tech. 30:5, May 1994. pp. 1277–1282.*

Shmulovich, J. et al. "Erbium–doped planar waveguide amplifiers integrated with silica waveguide technology." OFCC 2000, Mar. 2000, p. 2.*

Delevaux, J.–M.P. et al. Multiple carrier analog transmission system with Er/sup 3+/doped planar optical waveguide amplifiers OFCC 2000, Mar. 2000, pp. 64–66.*

Johnson, K.L. et al. "Observation of 1300–nm luminescence an amplificaiton in praseodymium–doped ZrO2 dielectric waveguides." OFC Technical Digest, 1997. pp. 211–212.*

Delevaux, J.–M.P. et al. "Gain Flatness of a planar optical waveguide amplifier." OFCC, 2000. Mar. 2000, pp. 3–5.*

Rutherford, T.S. et al. "Edge–Pumped Quasi–Three–Level Slab Lasers: Design and Power Scaling." IEEE J. Quantum Elect. 36:2, Feb. 2000. pp. 205–219.*

Sugimoto, N. et al. "A Hybrid Integrated Waveguide Isolator on a Silica–Based Planar Lightwave Circuit." J. Lightwave Tech. 14:11, Nov. 1996, pp. 2537–2546.*

* cited by examiner

OPTICAL AMPLIFIER, OPTICAL AMPLIFIER HYBRID ASSEMBLY AND METHOD OF MANUFACTURE

FIELD OF THE INVENTION

The invention relates to an optical amplifier, a hybrid assembly and a method of making the hybrid assembly. In particular, the invention relates to a doped glass amplifier and to a hybrid assembly including a doped glass amplifier and an optical pump, together with a method of manufacture of the same.

BACKGROUND OF THE INVENTION

FIG. 1 is a schematic diagram of a known erbium-doped fiber amplifier. In such an amplifier, a length of erbium-doped optical fiber 10 is provided to carry out the amplification. Signal light transmitted along a signal optical fiber 12 and pump light from a pump light source 14 are combined in an optical coupler 16 and sent along the erbium-doped optical fiber 10. In the fiber, the pump light excites atomic states of the erbium atom to create an inversion i.e. a situation in which higher energy states have a greater occupancy than lower states. In this situation, the signal light can create stimulated emission of light in phase with itself so that the erbium-doped fiber acts as an optical amplifier of the signal light.

Such erbium-doped fiber amplifiers are widely used, especially in transmission backbone systems in which optical signals have to be transmitted down great lengths of optical fiber. In such transmission backbone systems, the high cost of erbium-doped fiber amplifiers is not an issue.

However, there is an increasing need for amplifiers in smaller, local systems. These may range from metro systems inter-connecting a small area, to switched backplane systems inter-connecting a business or access systems delivering high bandwidth optical fiber connectivity to end users. In such systems, the high cost of conventional erbium-doped optical fiber amplifiers is a real issue and prevents wide spread use of such amplifiers.

Moreover, another difficulty with erbium-doped optical fiber amplifiers is that the signal is input along a single optical fiber, the input optical fiber 12 of FIG. 1. Although multiplexing techniques can be used to direct a plurality of signal down a single optical fiber for amplification, such techniques can be inconvenient. Often a separate erbium-doped fiber amplifier is required for each optical signal.

U.S. Pat. No. 5,982,973 to Yan et al describes a planar optical waveguide device, in which a specific glass composition is used. In an experimental result a net optical gain of 4.1 dB was obtained in a planar waveguide device having a length of 10 mm. However, such a device would simply replace a conventional erbium-doped optical fiber.

It is possible to integrate a number of optical components on a substrate to create a so-called optical hybrid. For example, U.S. Pat. No. 5,534,442 to Parker et al describes a process for use in manufacturing opto-electronic components in a hybrid module form. A hybrid substrate of silicon is provided with v-grooves for locating input and output optical fibres and a number of optical and electronic components are mounted on the substrate and interconnected. A number of refinements to this technique are known. For example, U.S. Pat. No. 5,574,811 to Bricheno et al, describes a method of aligning an optical fiber with a laser mounted on a silicon motherboard by using a silicon platform to which the end of the fiber is secured.

However, it is not easy to integrate Er-doped fiber amplifiers with such modules, since the fibers cannot simply be mounted directly to the substrate.

One approach has been suggested by Regener et al in U.S. Pat. No. 5,726,796. This patent describes an optical amplifier in which a waveguide is integrated on a substrate. The waveguides have a spiral configuration, and are integrated with optical couplers and a pump light source mounted on the substrate.

However, such approaches do little to reduce component count or simplify manufacturing of hybrid optical modules. Accordingly, there remains a need for an improved optical amplifier, an improved optical hybrid assembly and a corresponding method of manufacture.

SUMMARY OF THE INVENTION

According to the invention, there is provided an optical amplifier comprising a slab having opposed top and bottom surfaces and at least one edge surface extending between top and bottom surfaces, the slab defining an optical input for receiving light to be amplified on an edge surface, at least one optical waveguide extending from the optical input thorough a doped region of the slab for transmitting and amplifying the light received from the optical input, an optical output on an edge surface for delivering amplified light from the optical waveguide, and a pump light input for receiving pump light, wherein the slab is at least partially transparent and configured to distribute, through the slab, pump light incident on the pump light input over the length of the at least one optical waveguide.

The optical amplifier according to the invention can be readily incorporated into larger systems, and in particular into hybrid amplifier modules. A slab can be readily mounted on a substrate, which is not true of a fiber, and perhaps more importantly a slab optical amplifier with pump light input separate from and spaced away from the signal input/output is relatively straightforward to integrate with further components.

In prior art waveguide amplifiers, a coupler has been provided to couple both the signal light and the pump light into the input end of the waveguide. In contrast, in an optical amplifier according to the invention the pump light is pumped not into the end of the waveguide, but passes through the slab into the waveguide along the length of the waveguide. The omission of the optical coupler may simplify manufacture of systems using the optical amplifier according to the invention.

Moreover, there is no need to provide a pump light source that is capable of directing its light output down a narrow optical fiber. Instead, a broad stripe pump light source may be used; such pump light sources can provide more power at a given cost than the pump light sources conventionally used.

Also, separation of the pump light inputs and the signal light input and output means that each can have a reflection or anti-reflection coating appropriate to their own requirements. In particular, reflective material may be provided on the outer surface of the slab away from the optical input and output and the pump light input. The reflective material may multiply reflect pump light within the slab to distribute it across the interior of the slab and hence to provide pump light along the optical waveguide.

The pump light may be distributed over substantially all of the length of the optical waveguide since amplification can be most efficient if the whole waveguide is pumped. However, it is not essential that the pump light is absolutely evenly distributed.

The dopant concentration in the doped region may exceed $5 \times 10^{19}$ cm$^{-3}$ for providing significant amplification in a short length.

A significant advantage of the approach according to the invention is that a plurality of waveguides may be provided. The waveguides may be arranged in parallel with each other. In this way, a single optical amplifier and a single pump light source may amplifier the signals of a significant number, say ten, of input optical fibers. This approach can greatly reduce the cost of amplification because in a system in which signals on ten optical fibers need to be amplified only one amplifier is needed rather than ten.

Preferably, the slab has opposed top and bottom faces spaced apart by a distance substantially less than the smallest linear dimension of the top and bottom faces, and a pump edge face extending between the top and bottom faces at the periphery of the slab, the pump light input being on the pump edge face.

The form of a slab allows good distribution of pump light from the pump light input to the waveguide since the pump light can be retained in the slab by total internal reflection from the top and bottom faces. Light can bounce in the slab in a zigzag pattern. Furthermore, the use of the form of a slab allows good heat sinking, since heat can be removed from the top and bottom faces. The slab may be flat, which may allow easier mounting on a substrate.

A number of techniques may be used to assist in the distribution of pump light in the slab. The slab may be substantially transparent with pump light is contained between the top and bottom faces. The pump edge face having the pump light input may be oblique so that pump light incident on the pump edge face is refracted to pass through the slab in a zig-zag path. A layer of refractive material may be provided on the pump edge face to guide the pump light into the glass slab so that it takes a zig-zag path through the glass media surrounding the waveguides.

The slab may comprise an undoped substrate and a highly doped layer on the top face of the undoped substrate.

A patterned layer of high refractive index material may define the optical waveguide. The patted layer of high refractive index material may be arranged between the undoped substrate and the highly doped layer. The patterned layer may be Silicon Nitride.

The slab may be mounted on a further substrate; this need not necessarily be transparent.

In embodiments, the slab may have the form of a parallelipiped having planar top and bottom faces, opposed end faces normal to the top and bottom faces, a pump edge face being inclined with respect to a normal to the top and bottom faces, and a further edge face opposed to the pump edge face.

The at least one optical waveguide may extend between opposed end faces of the slab. There may be a plurality of waveguides.

In embodiments, the waveguides may extend in parallel between the opposed end faces. In this way, an optical amplifier in accordance with the invention can provide a plurality of optical amplifiers in a single body.

The at least one optical waveguide may take a convoluted path between opposed end faces of the slab for increasing the optical path length of the optical waveguide compared with a direct path. This increase in path length may be required, in particular for optical amplifiers operating in the L-band.

A further benefit of this approach for L-band amplification is that suitable materials, for example glasses, can be selected to greatly reduce up conversion in the L-band amplifier. Up conversion is a process in which electron in an excited state of an atom can be brought still higher energy level without emitting stimulated emission. Accordingly, the occupancy of the energy level that would provide the stimulated emission is lower, reducing the amplification efficiency. By choosing appropriate materials freely, it is possible to reduce these effects. Materials can be more freely chosen since it is not required to draw an optical fiber from the glass material.

In embodiments, the undoped substrate is of glass, although a number of other alternatives are also suitable including for example ceramics, glass-ceramics or a semiconductor substrate such as silicon.

The highly doped layer is likewise preferably of glass. Again, a number of alternative materials are also suitable. For example, a sol-gel process may be used to prepare a silica on silicon waveguide.

There may be a high dopant concentration of rare earth dopant, for example $1 \times 10^{20}$ cm$^{-3}$, in the highly doped glass layer. Such high dopant concentrations are very difficult to achieve with fiber amplifiers because the physical properties of the glass with high dopant concentrations are not suitable for drawing optical fibers. Accordingly, it is much easier to manufacture a high dopant concentration glass slab than high dopant concentration optical fibers. The dopant may alternatively or additionally be Thulium, Yttrium or some other species depending on the wavelength of the signal to be amplified.

A layer of high refractive index material may be provided to define the optical waveguide. The material may be silicon nitride, which may be arranged between the undoped substrate and the high doped glass layer.

The slab may be doped only in the optical waveguide, or only in a layer containing the optical waveguide. Alternatively the whole slab may be doped.

The slab may have reflective material for reflecting back pump light arranged on the outer surface of the slab away from the optical input and output and the pump light input.

The waveguide may extend across the slab from the optical input to the optical output. Alternatively, the optical input may also function as the optical output; light input at the optical input may pass down the waveguide, be reflected at the other end of the waveguide and pass back down the optical waveguide to emerge from the slab at the same location as the optical input.

A further improvement is obtained by providing a half wave plate along the path of the optical waveguide. This may be done, for example, by providing a groove in a doped glass slab and inserting a half-wave plate therein, alternatively, the half-wave plate may be integrally formed with the doped glass slab. An advantage of the half wave plate is that it exchanges the "TE" and "TM" mode fields. Accordingly, it can compensate for any effects caused by polarization dependent propagation in the waveguide. Preferably, the half-wave plate is half way down the optical waveguide to more accurately cancel any polarization effects.

In another aspect there is provided an optical amplifier comprising: an at least partially transparent body defining an optical input for receiving light to be amplified, at least one optical waveguide extending from the optical input thorough a doped region of the body for transmitting and amplifying the light received from the optical input, an optical output for delivering amplified light from the optical waveguide, and a pump light input for receiving pump light on the outer surface of the body laterally of the waveguide; and reflective material, on the outer surface of the body away from the optical input and output and the pump light input, for multiply reflecting pump light within the body to distribute it across the body so that pump light incident on the pump light input is distributed over the length of the at least one optical waveguide.

The reflective material on the outside of the body causes the pump light to be multiply reflected within the body to distribute pump light within the body and thus over the length of the optical waveguide or waveguides.

In another aspect an optical hybrid assembly has a hybrid substrate, an optical amplifier as described above mounted on the substrate, and an optical pump mounted on the hybrid substrate adjacent to the optical amplifier arranged to direct pump light into the pump light input.

The term "hybrid substrate" is intended to mean a substrate of a hybrid assembly, and not to imply that the substrate itself need be hybrid. The hybrid substrate may be of silicon. Alternatively, any suitable hybrid substrate material may be used.

The optical amplifier described above is particularly suited to mounting in such a hybrid assembly. The amplifier can be handled by conventional chip mounting techniques, for ease of manufacture. In this technique the active components are mounted face down on the hybrid substrate. The pump light source may be a broad band semiconductor emitter emitting light, not at a single point but over an extended edge. Such chips are considerably cheaper than those required to direct light into an optical fiber, and accordingly much higher pump powers may be provided for the same cost than in previous arrangements.

The hybrid assembly may further comprise a carrier substrate having at least one mating member and carrying at least one optical fiber, wherein the hybrid substrate carries at least one mating member for interlocking with the at least one mating member of the carrier substrate to locate the carrier substrate on the hybrid substrate and to align the at least one optical fiber with the at least one waveguide.

The hybrid assembly preferably comprises at least one input optical fiber located to direct light into the input of the at least one waveguide and at least one output optical fiber located to receive light emitted from the output of the at least one waveguide.

The pump light source may be a broad stripe semiconductor emitter. Alternatively any suitable pump light source may be used.

In a further aspect the invention may provide an optical communications system comprising an optical amplifier module including a hybrid assembly as described above.

In a further aspect there may be provided a method of assembling an optical hybrid assembly comprising the steps of providing a hybrid substrate, providing a slab amplifier having top, bottom, opposed end and opposed edge faces, comprising at least one waveguide extending between opposed end faces arranged adjacent to the top face of the slab, flip-mounting the slab amplifier on the hybrid substrate with the top face of the slab amplifier against the hybrid substrate, and mounting an optical pump adjacent to the slab amplifier to pump light into the edge face of the slab amplifier.

Preferably, the method further comprises the step of mounting at least one optical fiber on the substrate in registration with the at least one waveguide. In embodiments, this step may be carried out by mounting the at least one optical fiber on a carrier substrate, and mounting the carrier substrate on the hybrid substrate to locate the at least one optical fiber in registration with the at least one waveguide.

The carrier substrate may be adapted to interlock with the hybrid substrate in registration with the hybrid substrate.

Preferably, the method comprises the step of adjusting the exact position of the carrier substrate after mounting it on the hybrid substrate to improve the registration of the at least one optical fiber against the at least one waveguide, and then fixing the carrier substrate to the hybrid substrate by curing rapid cure adhesive. This may be carried out by adjusting the position of the carrier substrate whilst measuring light throughput from the at least one optical fiber into or from the at least one waveguide, to find a good position for high optical throughput, adjusting the position of the carrier substrate by a predetermined amount for compensating the shrinkage of the rapid cure adhesive, and curing the rapid cure adhesive to fix the position of the carrier substrate.

The assembly may use "Silicon microbench" techniques.

In a yet further aspect, the invention may provide a method of amplifying an optical signal, comprising: inputting signal light into an optical input on the periphery of a slab; passing the signal light through optical waveguide extending across a slab from the optical input; inputting pump light into a pump light input on the periphery of the slab so that pump light is multiply reflected within the slab to distribute pump light along the length of the optical waveguide; amplifying the signal light as it passes along the waveguide; and outputting amplified signal light from the doped optical waveguide.

BRIEF DESCRIPTION OF THE DRAWINGS

For a better understanding of the invention, and purely by way of example, specific embodiments of the invention will now be described with reference to the accompanying drawings, in which.

DETAILED DESCRIPTION

Figure 1:
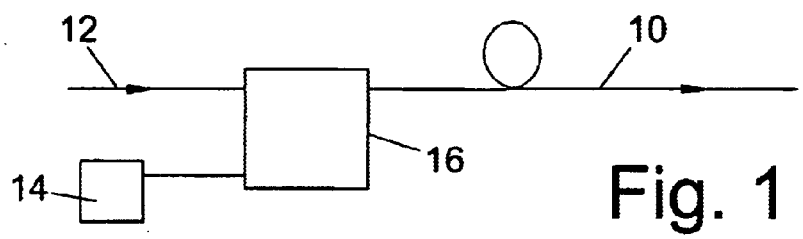
FIG. 1 shows a schematic drawing of a prior art erbium doped fiber amplifier.
Figure 2:
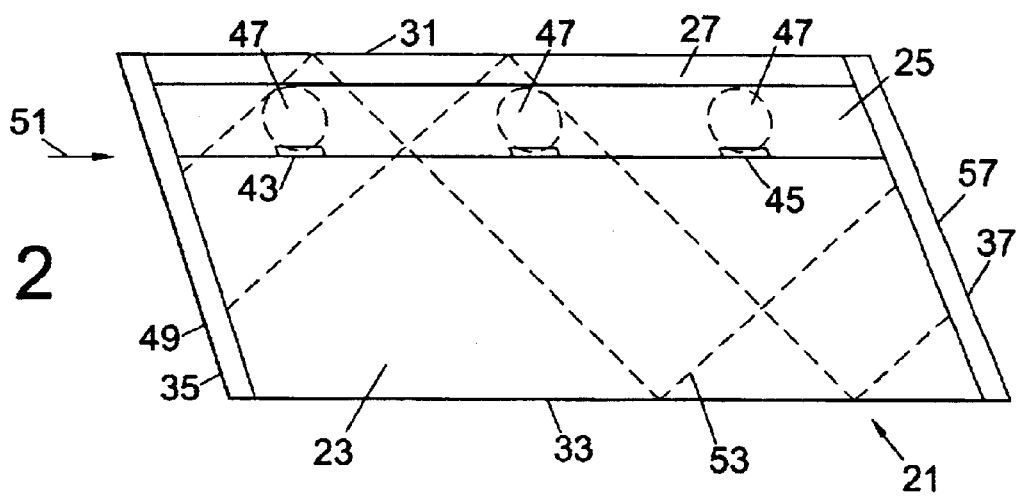
FIG. 2 shows a section through an optical amplifier according to the invention.

Referring to FIG. 2, the optical fiber amplifier 21 is formed on an undoped glass slab 23 on the top surface of which is provided a highly doped glass layer 25. The highly doped glass layer 25 is formed from phosphate glass within an erbium doping concentration of $1 \times 10^{20}$ cm$^{-3}$ and an ytterbium doping concentration of $4 \times 10^{20}$ cm$^{-3}$. In order to match the thermal expansion coefficient, the undoped glass substrate is formed of the same phosphate glass as the doped glass layer, but omits the ytterbium and erbium doping.

A top planarization layer of polymer 27 is provided above the highly doped glass layer 25.

Figure 3:
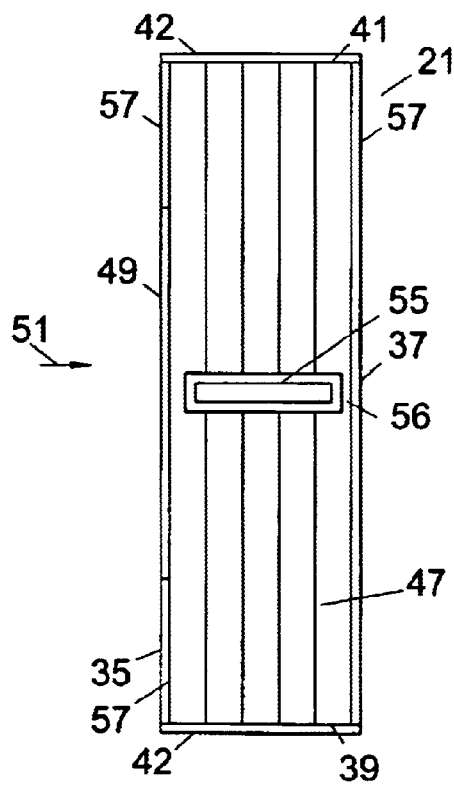
FIG. 3 shows a top view of an optical amplifier according to the invention.

The glass slab is in the form of a parallellipiped having a top face 31 parallel to a bottom face 33, edge faces 35 and 37 and end faces 39, 41 (see FIG. 3). The end faces 39, 41 are arranged perpendicularly to the plane of the top and bottom faces 31, 33, whereas the edge faces 35, 37 are oblique, in other words, inclined at an angles to the normal to the plane of the top and bottom faces 31, 33.

Because of the large amount of doping in the highly doped glass layer 25, the refractive index there is significantly different to that in the undoped glass layer 23. For example, the refractive index in the highly doped glass layer may be 1.52 and that in the undoped glass layer may be 1.5. The refractive index in the polymer layer may be 1.47. This difference in refractive index is sufficient to contain light in slab modes largely within the highly doped glass layer 25.

However, it is also preferred to confine the modes laterally. Accordingly, a layer 43 of silicon nitride, which has a much larger refractive index around 1.98, is provided between the undoped and doped glass layers 23, 25. The silicon nitride layer 43 is roughly 500 angstroms thick and is patterned to form a plurality of stripes 45 each 5 micrometers wide. These stripes define a plurality of optical waveguides 47 which extend in parallel between an optical input and an optical output on corresponding opposed end faces 39, 41. The light travels largely in the highly doped layer 25. The stripes are arranged at 250 micrometer intervals to match the centre spacing of conventional optical ribbon cable. At this distance apart, the optical coupling between the various waveguide modes 47 is very slight. Accordingly, the optical amplifier 21 has a plurality of well separated waveguides extending along the length of the slab between the two end faces 39, 41. One end face 39 forms the optical inputs and the opposite end face forms the optical outputs.

An anti-reflective coating 49 is provided on one edge face 39 of the glass slab 21 to couple pump light into the slab. Pump light 51 incident on this edge face is refracted and passes through the glass slab 21 in a zig zag fashion as shown by the dotted path 53 in FIG. 2. The opposite edge face 37 of the glass slab 21 is provided with a metallic reflective layer, of gold 57, which reflects the pump light back in the glass slab to increase the pumping effectiveness. This reflective coating is also provided on other faces, for example the top and bottom surfaces and the part of the edge face 39 away from the pump light input, to retain pump light in the slab.

The intention of using a slab and a reflection coating is that pump light is distributed along the length of the waveguide. This is in contrast to conventional arrangements in which pump light is depleted along the length of the fiber. This depletion is a significant constraint on conventional doped fiber amplifiers that is avoided using the present invention.

The glass slab 21 may be at least 15 microns thick, 1 mm to 30 mm wide (between edge faces 35 and 37), and 10 mm to 30 mm long (between opposed end faces 39, 41). It will be appreciated that the drawings are not to scale, for clarity.

FIG. 3 shows the glass slab 1 in schematic top view illustrating the plurality of parallel waveguides 47 extending between the opposed end faces 39 and 41. A half-wave plate 55 is provided midway between the opposed end faces 39, 41 in order to switch the TE and TM polarization modes. The propagation in the waveguides 47 and the doped glass slab is not wholly polarization independent; the half wave plate can switch the modes halfway down the length of the waveguides 47 to correct for this effect. The half-wave plate is arranged in a groove 56 in the top surface of the substrate.

Non-reflection coatings 42 are provided on the opposed end faces 39, 41 to reduce reflection of signal light.

Figure 4:
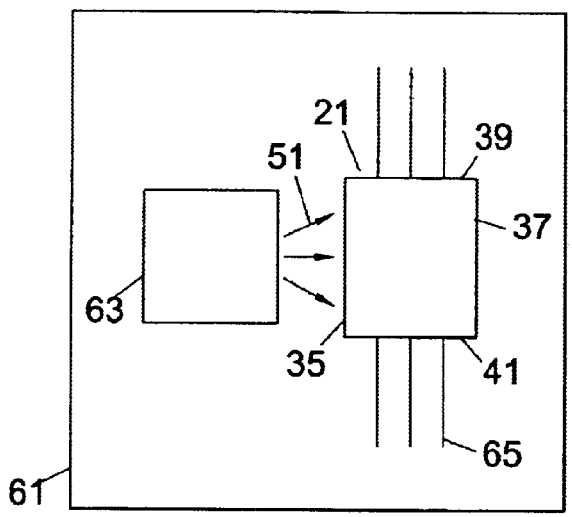
FIG. 4 shows a top view of an optical hybrid assembly according to the invention.
Figure 5:
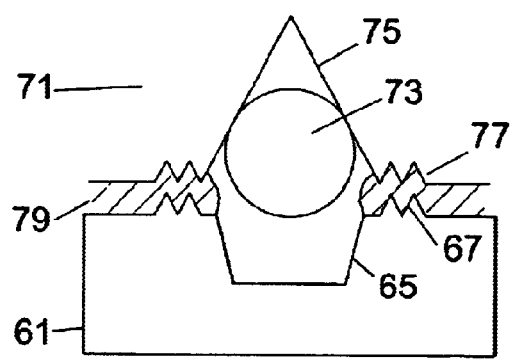
FIG. 5 illustrates the location of the optical fiber on a carrier substrate.

Referring to FIG. 4, the doped glass substrate 21 is shown mounted face down on a hybrid substrate 61. The doped glass substrate 21 is fixed to the hybrid substrate by means of an epoxy resin. A broad band semiconductor optical pump 63 is mounted adjacent to the doped glass substrate 21 to emit pump light 51 into the edge face 35 of the doped glass substrate 21. The pump light source 63 is likewise mounted "Flip-Chip" fashion, on the hybrid substrate 61. The hybrid substrate 61 also comprises a plurality of grooves 65 whose function will now be described with reference to FIG. 5. The grooves are intended to aid in the location of optical fibers in registration with the optical waveguides 47 in the doped glass substrate 21. As can be seen in FIG. 5, the grooves comprise a plurality of teeth 67. The optical fibers 73 are mounted in grooves 75 on a carrier substrate 71, which likewise carries a plurality of teeth 77. These teeth are shaped to interlock with the teeth 67 to fix the position of the carrier substrate 71 on the hybrid substrate 61. The carrier substrate 71 is a silicon substrate, as is the hybrid substrate 61, and both substrates are grown and patterned so that when the carrier substrate 71 is mounted on the hybrid substrate 61 the crystal planes of the two substrates are aligned with a common orthonomic axis.

Epoxy resin 79 is used to hold the carrier substrate down on the hybrid substrate 61.

The method of assembly of the hybrid substrate of FIG. 4 will now be described. Firstly, the hybrid substrate 61 is provided and then the doped glass substrate 21 and the optical pump 63 are mounted face down on the substrate using an epoxy resin. The epoxy resin is cured.

Figure 6:
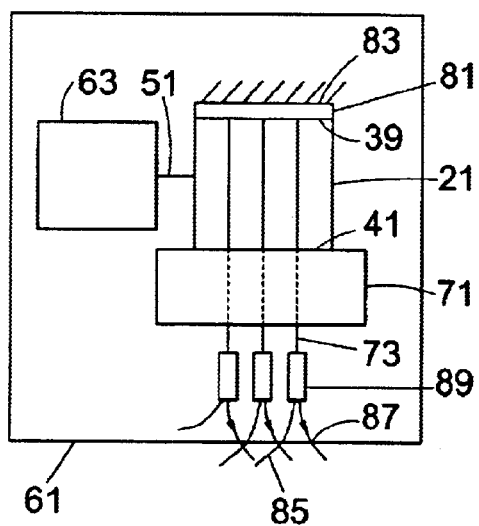
FIG. 6 illustrates a second embodiment of the invention having a reflector on one end face of the optical fiber amplifier.

Optical fibers 73 are mounted in the groves 75 of the carrier substrate 71. The ends of 81 of the optical fibers 73 are arranged to be flush with the end 83 of the carrier substrate 71 (see FIG. 6). The carrier substrate 71 is then brought down on to the hybrid substrate 61 using the interlocking means 67, 77 to exactly align the carrier and hybrid substrates orthonomically. The shape of the groove 75 is arranged such that in this position the optical fiber is aligned laterally in registration with the doped glass substrate 21, but such that the vertical registration requires the carrier substrate to be raised slightly away from the hybrid substrate 61. This play allows room for the final adjustment of the position of the optical fibers 73.

This final adjustment is carried out by shining light down the optical fibers 73 and measuring the light throughput into the doped glass substrate 21. The position of the carrier substrate 71 is then adjusted to optimise the light transmission from all of the optical fibers 73 into the doped glass substrate 21.

Then the carrier substrate 71 is lifted by a predetermined amount and the quick setting epoxy resin 79 is cured. During the curing step the epoxy resin 79 shrinks by a known amount. This shrinkage is compensated for by the previous step of raising the carrier the substrate 71 by a predetermined amount, so that the optical fibers end up in good alignment with the waveguides 47 in the doped glass substrate 21. This procedure is repeated for carrier substrates at both ends of the doped glass substrate to provide both input and output optical fiber connections.

Further details of the hybrid flip chip assembly techniques used are provided in GB 2213957, and in U.S Pat. Nos. 5,534,442, 5,668,823 and 5,574,811. These four patents are incorporated herein by reference.

Figure 7:
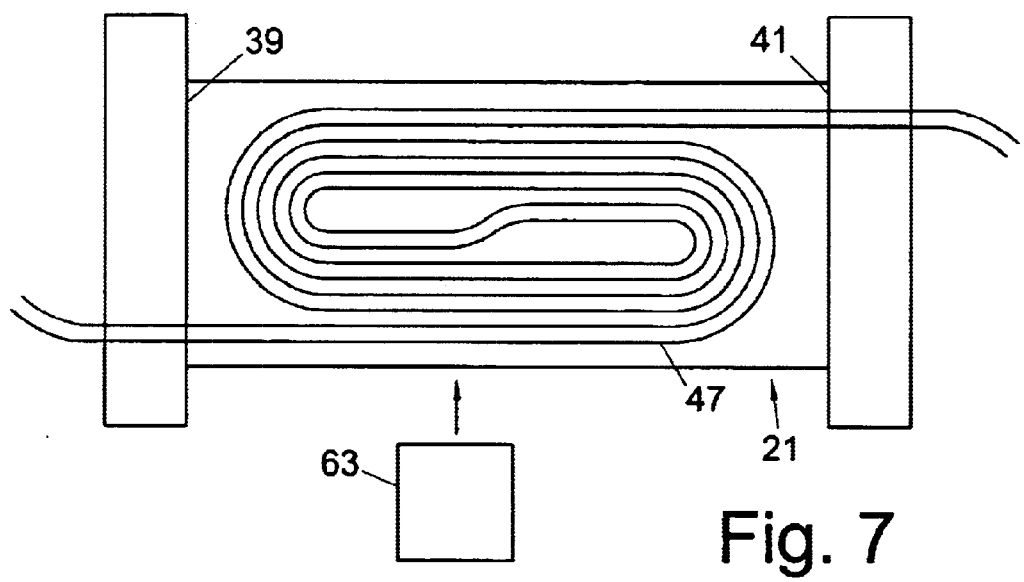
FIG. 7 shows a third embodiment of the invention having a convoluted path on the optical fiber amplifier to increase the optical path length.

Referring to FIG. 7, a second embodiment of the invention will now be described. In the second embodiment, optical fibers 73 are provided at only one end face 41 of the doped glass substrate 21. On the other end face 39 of the doped glass substrate 21 is provided a quarter wave plate 81 and a reflector 83. The quarter wave plate 81 has the same function as the half wave plate 55 in the first embodiment, but because the light is reflected by the reflector 83 and so passes through it twice a quarter wave plate rather than a half wave plate is used to get the same effect.

The optical fibers 73 carry both input and output signals, and so these are connected to optical circulators 89. Input light travelling along input optical fibers 85 are directed through optical fibers 73 into the optical amplifiers. The amplified light output along optical fibers 73 is directed by the circulators along output optical fibers 87. The function of such optical circulators is well known. The optical circulators are mounted on the hybrid substrate 61.

Figure 8:
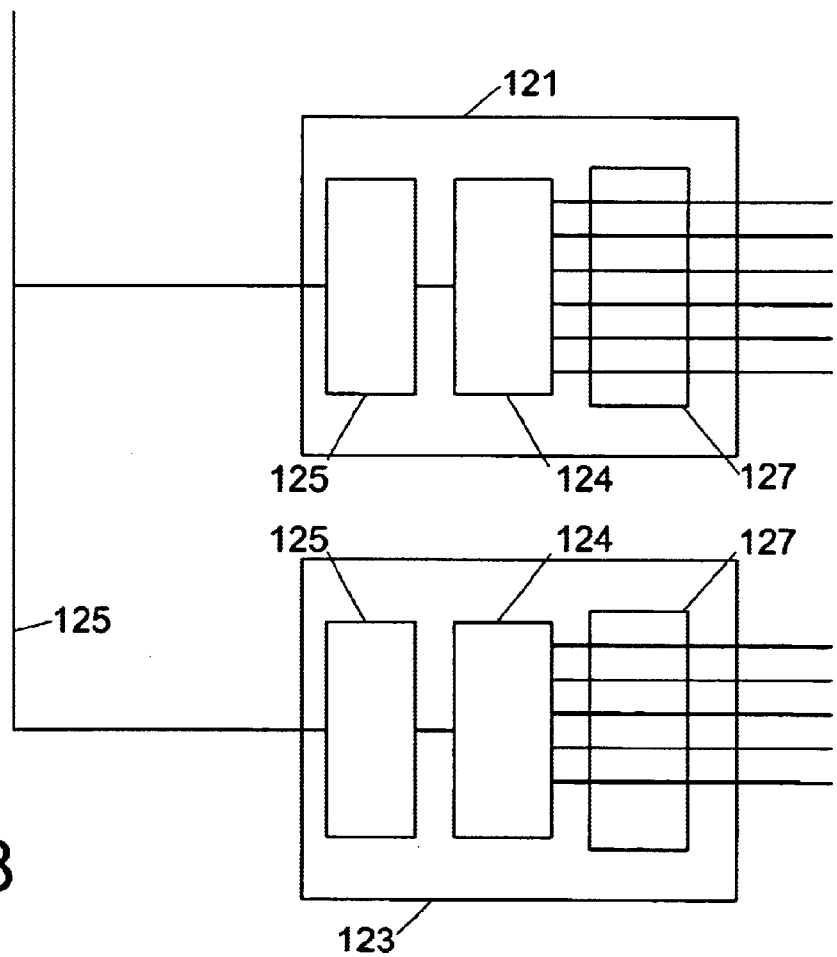
FIG. 8 shows an optical communications system according to the invention.

A third embodiment is shown in FIG. 8. In this embodiment, the optical amplifier is intended to amplify L-band optical light and so the path length of the optical waveguide is much longer than for C-band amplification. Therefore, the optical waveguides 47 are arranged in a convoluted form so that the path length of the optical waveguides is much longer than the distance between end faces 39, 41 of the doped glass plate 21. The convoluted waveguides may nested in a structure similar to a spiral. In this way a waveguide length within a 30 mm by 30 mm slab could be as much as 1 m or more. The waveguide areal density may be quite high. The minimum bend radius is determined by the waveguide design parameters.

The hybrid optical amplifier may be included in a hybrid optical amplifier module which may be incorporated into an optical communications system. Referring to FIG. 9 first and second nodes 121,123 are shown schematically connected by a fiber backbone 125. Of course, many more nodes than two may be connected. Each node contains hybrid amplifier modules 125,127 including a hybrid amplifier assembly as described above. The amplifier modules are shown on both the inputs and outputs of an optical processor 129 which may be, purely by way of example, an optical switch.

It can be seen that the local area hybrid amplifier modules are each connected to a number of optical fibers. However, only one module is shown; one module can amplify a plurality of signals passing down a plurality of fibers by including a plurality of waveguides arranged side by side in a slab as explained above.

Although the invention has been described with reference to a number of specific examples, these are not intending to be limiting and a skilled person will readily envisage alternative implementations of the invention.

For example, the skilled person may incorporate techniques for optimising the distribution of pump light across the doped glass plate 21, such as those described for slab lasers by Rutherford, Tulloch, Gustafson and Byer in "Edge-pumped Quasi-Three-level slab lasers; Design and Power Scaling", IEEE Journal of Quantum Electronics, volume 36, number 2, February 2000.

The glasses used may be those proposed already for erbium-doped planer optical devices, for example those proposed in the previously mentioned U.S. Pat. No. 5,563,979 to Bruce et al or in U.S. Pat. No. 5,982,9732 Yan et al.

Many other alternative techniques for defining waveguides are known, and any of these may be used where they are suitable. The use of the half and quarter wave plates to remove the polarization dependence may be omitted where such polarization independence is not required.

The optical waveguides may be made by a sol-gel fabrication technique, such as described by Yeatman et al in "Sol-Gel Fabrication of Rare-Earth Doped Photonic Components", Journal of Sol-Gel Science and Technology, volume 19, pages 231–236, July 2000. This approach provides a doped Silica on Silicon waveguide.

The number and spacing of waveguides may be adjusted to suit the application for which the optical amplifier is intended.

Although the terms "input" and "output" are used above the skilled person will readily appreciate that the amplifier according to the invention can be used to amplify optical signals travelling in both directions along the waveguide between input and output.

The techniques according to the invention are suitable for ease of manufacture which may deliver much low cost per channel hybrid amplifier modules. Such lower-cost amplifiers are essential for local optical fiber systems now being implemented.

We claim:

1. An optical amplifier comprising:
a slab having top and bottom surfaces and a periphery around the perimeter of the top and bottom surfaces, the slab defining an optical input for receiving light to be amplified at the periphery of the slab, at least one optical waveguide extending across the slab from the optical input through a doped region of the slab for transmitting and amplifying the light received from the optical input, an optical output at the periphery of the slab for delivering amplified light from the optical waveguide, and a pump light input for receiving pump light;
wherein the slab is at least partially transparent and configured to distribute, through the slab, pump light incident on the pump light input over the length of the at least one optical waveguide and said slab comprises an undoped substrate and a highly doped layer on the top face of the undoped substrate;
wherein a patterned layer of high refractive index material defines the optical waveguide, said layer being arranged between the undoped substrate and the highly doped glass layer;
and said amplifier further comprises a half-wave plate in the path of the optical waveguide.

2. An optical amplifier according to claim 1 further comprising reflective material on the outer surface of the slab for multiply reflecting pump light within the slab to distribute it across the slab and hence to the optical waveguide.

3. An optical amplifier according to claim 1 wherein the slab is substantially transparent and pump light is contained between the top and bottom faces.

4. An optical amplifier according to claim 1 wherein the pump light input is on an oblique pump edge face so that pump light laterally incident on the pump edge face is refracted to pass through the slab in a zig-zag path.

5. An optical amplifier according to claim 4, wherein a layer of anti-reflective material is provided on the pump edge face at the pump light input to couple the pump light into the glass slab.

6. An optical amplifer according to claim 1 wherein the at least one optical waveguide extends between opposed end faces of the slab in a convoluted path for increasing the optical path length of the optical waveguide compared with a direct path.

7. An optical amplifier according to claim 1 wherein a plurality of optical waveguides are provided, the pump light being distributed to each of the waveguides.

8. An optical amplifier according to claim 7, wherein the plurality of optical waveguides extend parallel to one another between opposed end faces of the slab.

9. An optical amplifier according to claim 1 in the form of a parallelipiped having substantially planar top and bottom faces, opposed end faces normal to the top and bottom faces, a pump edge face inclined with respect to a normal to the top and bottom faces, and a further edge face opposed to the pump edge face.

10. An optical amplifier according to claim 1, wherein the dopant concentration in the doped region exceeds $5 \times 10^{19}$ $cm^{-3}$.

11. An optical amplifier according to claim 1, wherein the at least partially transparent body is doped with Erbium.

12. An optical hybrid assembly comprising:
a hybrid substrate;
an optical amplifier comprising a slab having top and bottom surfaces and a periphery, the slab defining an optical input for receiving light to be amplified at the periphery of the slab, at least one optical waveguide extending across the slab from the optical input through a doped region of the slab for transmitting and amplifying the light received from the optical input, an optical output at the periphery of the slab for delivering amplified light from the optical waveguide, and a pump light input at the periphery of the slab for receiving pump light, wherein the slab is at least partially transparent and configured to distribute, through the slab, pump light incident on the pump light input over the length of the at least one optical waveguide and said slab comprises an undoped substrate and a highly doped layer on the top face of the undoped substrate; wherein a patterned layer of high refractive index material defines the optical waveguide, said layer being arranged between the undoped substrate and the highly doped glass layer; and said amplifier further comprising a half-wave plate in the path of the optical waveguide; and
an optical pump mounted on the hybrid substrate adjacent to the optical amplifier arranged to direct pump light into the pump light input.

13. An optical hybrid assembly according to claim 12, wherein the optical amplifier is mounted to the hybrid substrate as a flip chip with its top face against the hybrid substrate.

14. An optical hybrid assembly according to claim 12 further comprising a carrier substrate having at least one mating member and carrying at least one optical fiber, wherein the hybrid substrate has at least one mating member for interlocking with the at least one mating member of the carrier substrate to locate the carrier substrate on the hybrid substrate and to align the at least one optical fiber with the at least one waveguide.

15. An optical hybrid assembly according to claim 12 comprising at least one input optical fiber located to direct light into the at least one waveguide through one end face of the slab and at least one output optical fiber located to receive light emitted from the opposite end face of the slab.

16. An optical hybrid assembly according to claim 12 wherein the pump light input is on an oblique edge.

17. An optical hybrid assembly according to claim 12 comprising a plurality of optical waveguides extending across the slab between a plurality of respective inputs and outputs.

18. An optical amplifier according to claim 17, wherein the plurality of optical waveguides extend parallel to one another directly between opposed end faces of the slab.

19. An optical hybrid assembly according to claim 12, wherein a layer of refractive material is provided on the pump light input to direct the pump light into the glass slab so that it takes a zig-zag path through the glass slab.

20. An optical hybrid assembly according to claim 12, wherein the optical pump is a broad stripe semiconductor emitter.

21. A method of assembling an optical hybrid assembly comprising the steps of
providing a hybrid substrate;
providing an optical amplifier comprising a slab having an optical input on an edge surface for receiving light to be amplified, at least one optical waveguide extending across the slab from the optical input through a doped region of the slab for transmitting and amplifying the light received from the optical input, an optical output for delivering amplified light from the optical waveguide, and a pump light input for receiving pump light on the outer surface of the slab laterally of the waveguide, wherein the slab is at least partially transparent and configured to distribute, through the slab, pump light incident on the pump light input over the length of the at least one optical waveguide and said slab comprises an undoped substrate and a highly doped layer on the top face of the undoped substrate; wherein a patterned layer of high refractive index material defines the optical waveguide, said layer being arranged between the undoped substrate and the highly doped glass layer;
providing one of a half-wave plate and a quarter-wave plate;
mounting said wave plate on the amplifier in the path of the optical beam;
flip-mounting the optical amplifier on the hybrid substrate with the top face of the slab amplifier against the hybrid substrate; and
mounting an optical pump adjacent to the slab amplifier to pump light into the edge face of the slab amplifier.

22. A method of assembling an optical hybrid assembly according to claim 21 further comprising the step of mounting at least one optical fiber on the substrate in registration with the at least one waveguide by
mounting the at least one optical fiber on a carrier substrate; and
mounting the carrier substrate on the hybrid substrate to locate the at least one optical fiber in registration with the at least one waveguide such that light is able to pass from one of the optical fibre and the waveguide to an other of the optical fibre and the waveguide.

23. A method of assembling an optical hybrid assembly according to claim 22, wherein the carrier substrate is adapted to interlock in registration with the hybrid substrate.

24. A method of assembling an optical hybrid assembly according to claim 23, further comprising the step of adjusting the exact position of the carrier substrate after mounting it on the hybrid substrate to improve the registration of the at least one optical fiber against the at least one waveguide, and then fixing the carrier substrate to the hybrid substrate by curing rapid cure adhesive.

25. A method of assembling an optical hybrid assembly according to claim 24, wherein the step of adjusting the exact position is carried out by
adjusting the position of the carrier substrate whilst measuring light throughput from the at least one optical fiber into or from the at least one waveguide, to find a good position for high optical throughput;

adjusting the position of the carrier substrate by a predetermined amount for compensating the shrinkage of the rapid cure adhesive; and curing the rapid cure adhesive to fix the position of the carrier substrate.

26. An optical amplifier comprising:

an at least partially transparent body defining an optical input for receiving light to be amplified, at least one optical waveguide extending from the optical input through a doped region of the body for transmitting and amplifying the light received from the optical input, an optical output for delivering amplified light from the optical waveguide, and a pump light input for receiving pump light on the outer surface of the body laterally of the waveguide, wherein said body comprises an undoped substrate and a highly doped layer on the top face of the undoped substrate and wherein a patterned layer of high refractive index material defines the optical waveguide, said layer being arranged between the undoped substrate and the highly doped glass layer;

one of a half-wave plate and a quarter-wave plate placed between the optical input and the optical output; and reflective material, on the outer surface of the body away from the optical input and output and the pump light input, for multiply reflecting pump light within the body to distribute it across the body so that pump light incident on the pump light input is distributed over the length of the at least one optical waveguide.

27. An optical amplifier according to claim 26 including a plurality of waveguides extending between respective inputs and outputs within the body, pump light being distributed over the length of each of the plurality of waveguides.

28. An optical hybrid assembly comprising:

a hybrid substrate;

an optical amplifier comprising a slab having top and bottom surfaces and a periphery, the slab defining an optical input for receiving light to be amplified at the periphery of the slab, at least one optical waveguide extending across the slab from the optical input through a doped region of the slab for transmitting and amplifying the light received from the optical input, an optical output at the periphery of the slab for delivering amplified light from the optical waveguide, and a pump light input at the periphery of the slab for receiving pump light, wherein the slab is at least partially transparent and configured to distribute, through the slab, pump light incident on the pump light input over the length of the at least one optical waveguide and said slab comprises an undoped substrate and a highly doped layer on the top face of the undoped substrate; wherein a patterned layer of high refractive index material defines the optical waveguide, said layer being arranged between the undoped substrate and the highly doped glass layer; and said amplifier further comprising a quarter wave film and a reflector against one end face of the doped glass slab and at least one optical circulator connected to an opposite end face of the glass slab; and an optical pump mounted on the hybrid substrate adjacent to the optical amplifier arranged to direct pump light into the pump light input.

29. An optical communications system comprising a plurality of interconnected nodes, at least some of the nodes including an optical hybrid amplifier module comprising a hybrid substrate, an optical amplifier comprising a slab having top and bottom surfaces and a periphery, the slab defining an optical input for receiving light to be amplified at the periphery of the slab, at least one optical waveguide extending across the slab from the optical input through a doped region of the slab for transmitting and amplifying the light received from the optical input, an optical output the a periphery of the slab for delivering amplified light from the optical waveguide, and a pump light input at the periphery of the slab for receiving pump light, wherein the slab is at least partially transparent and configured to distribute, through the slab, pump light incident on the pump light input over the length of the at least one optical waveguide and said slab comprises an undoped substrate and a highly doped layer on the top face of the undoped substrate; wherein a patterned layer of high refractive index material defines the optical waveguide, said layer being arranged between the undoped substrate and the highly doped glass layer; and said amplifier further comprising a half-wave plate in the path of the optical waveguide; and an optical pump mounted on the hybrid substrate adjacent to the optical amplifier arranged to direct pump light into the pump light input.

30. A method of amplifying an optical signal, comprising:

inputting signal light into an optical input on the periphery of an at least partially transparent slab, wherein said slab comprises an undoped substrate and a highly doped layer on the top face of the undoped substrate;

passing the signal light through an optical waveguide extending across a slab from the optical input, said waveguide being defined by a patterned layer of high refractive index material, said layer being arranged between the undoped substrate and the highly doped glass layer;

passing the signal light through one of a half-wave plate and a quarter-wave plate inputting pump light into a pump light input on the periphery of the slab so that pump light is multiply reflected within the slab to distribute pump light along the length of the optical waveguide;

amplifying the signal light as it passes along the waveguide; and outputting amplified signal light from the doped optical waveguide.

* * * * *